(12) United States Patent
Kim et al.

(10) Patent No.: US 11,891,059 B2
(45) Date of Patent: Feb. 6, 2024

(54) SYSTEM AND METHODS OF INTEGRATING VEHICLE KINEMATICS AND DYNAMICS FOR LATERAL CONTROL FEATURE AT AUTONOMOUS DRIVING

(71) Applicant: Canoo Technologies Inc., Torrance, CA (US)

(72) Inventors: Kilsoo Kim, Hermosa Beach, CA (US); Aviral Singh, Torrance, CA (US); David R. Arft, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 148 days.

(21) Appl. No.: 17/305,703

(22) Filed: Jul. 13, 2021

(65) Prior Publication Data
US 2023/0026680 A1 Jan. 26, 2023

(51) Int. Cl.
*B60W 30/12* (2020.01)
*B60W 40/072* (2012.01)
(Continued)

(52) U.S. Cl.
CPC ............ *B60W 30/12* (2013.01); *B60W 10/18* (2013.01); *B60W 10/20* (2013.01);
(Continued)

(58) Field of Classification Search
CPC .. B60W 10/18; B60W 10/20; B60W 2520/14; B60W 2420/42; B60W 2420/52; B60W 2520/06; B60W 2520/105; B60W 2520/28; B60W 2552/30; B60W 2710/207; B60W 30/045; B60W 30/12;
(Continued)

(56) References Cited

U.S. PATENT DOCUMENTS 6,675,094 B2    1/2004  Russell et al.
9,352,778 B2 *  5/2016  Yoon .................... B62D 15/025
(Continued)

FOREIGN PATENT DOCUMENTS

CN    109740469 A    5/2019
CN    111344646 A    6/2020
(Continued)

OTHER PUBLICATIONS

Final Office Action dated Feb. 23, 2023, in connection with U.S. Appl. No. 17/305,702, 10 pages.
(Continued)

*Primary Examiner* — Babar Sarwar

(57) ABSTRACT

An apparatus includes at least one camera configured to capture an image of a traffic lane in front of a vehicle. The apparatus also includes a path tracking controller configured to detect lane boundaries and a path curvature for the traffic lane from the image, determine a lateral offset of the vehicle from a reference path for the traffic lane and a heading offset for the vehicle from the path curvature, determine a yaw rate maintaining the vehicle within the traffic lane using a kinematics control, determine a steering angle maintaining the vehicle within the traffic lane using a dynamics control and the yaw rate determined by the kinematics control, and activate a steering control based on the determined steering angle.

20 Claims, 11 Drawing Sheets

(51) Int. Cl.
*B60W 40/105* (2012.01)
*B60W 10/18* (2012.01)
*B60W 10/20* (2006.01)
*G06V 20/56* (2022.01)

(52) U.S. Cl.
CPC ........ *B60W 40/072* (2013.01); *B60W 40/105* (2013.01); *G06V 20/588* (2022.01); *B60W 2520/14* (2013.01); *B60W 2552/30* (2020.02); *B60W 2710/207* (2013.01)

(58) Field of Classification Search
CPC ... B60W 40/072; B60W 40/105; G01P 15/08; G06V 20/588
See application file for complete search history.

(56) References Cited

U.S. PATENT DOCUMENTS

| | | | |
|---|---|---|---|
| 9,595,197 | B2 | 3/2017 | Lee |
| 10,227,039 | B1 * | 3/2019 | Prasad .................. B60W 40/08 |
| 11,104,336 | B2 | 8/2021 | Lin et al. |
| 11,237,562 | B2 | 2/2022 | Schultz et al. |
| 11,260,757 | B2 | 3/2022 | Degand et al. |
| 11,328,593 | B2 | 5/2022 | Urano et al. |
| 11,535,274 | B2 | 12/2022 | Dingli et al. |
| 2003/0229438 | A1 | 12/2003 | Hac |
| 2004/0164851 | A1 | 8/2004 | Crawshaw |
| 2008/0071451 | A1 | 3/2008 | Yamaguchi et al. |
| 2009/0021358 | A1 | 1/2009 | Lee et al. |
| 2009/0030613 | A1 | 1/2009 | Kataoka et al. |
| 2009/0037062 | A1 | 2/2009 | Lee et al. |
| 2009/0157263 | A1 * | 6/2009 | Shin ..................... B62D 5/0481 701/43 |
| 2009/0284360 | A1 | 11/2009 | Litkouhi |
| 2010/0172542 | A1 | 7/2010 | Stein et al. |
| 2010/0182139 | A1 | 7/2010 | Chen et al. |
| 2012/0022739 | A1 * | 1/2012 | Zeng ........................ B62D 1/28 348/148 |
| 2012/0050074 | A1 | 3/2012 | Bechtel et al. |
| 2013/0190982 | A1 | 7/2013 | Nakano et al. |
| 2013/0190985 | A1 | 7/2013 | Nakano et al. |
| 2013/0261898 | A1 * | 10/2013 | Fujita ..................... B62D 7/159 701/42 |
| 2013/0321172 | A1 | 12/2013 | Igarashi et al. |
| 2013/0335213 | A1 | 12/2013 | Sherony et al. |
| 2013/0345900 | A1 | 12/2013 | Usui |
| 2014/0002655 | A1 | 1/2014 | Woo et al. |
| 2014/0236428 | A1 * | 8/2014 | Akiyama ............... G08G 1/165 701/42 |
| 2015/0149037 | A1 | 5/2015 | Lim et al. |
| 2015/0314783 | A1 | 11/2015 | Nespolo et al. |
| 2017/0010618 | A1 | 1/2017 | Shashua et al. |
| 2017/0313253 | A1 | 11/2017 | Hughes et al. |
| 2018/0024238 | A1 | 1/2018 | Khlifi |
| 2018/0024562 | A1 | 1/2018 | Bellaiche |
| 2018/0025235 | A1 | 1/2018 | Fridman |
| 2018/0141528 | A1 * | 5/2018 | Oh .................. B60W 30/18127 |
| 2018/0150700 | A1 | 5/2018 | Kaneko et al. |
| 2018/0186378 | A1 | 7/2018 | Zhuang et al. |
| 2018/0237007 | A1 | 8/2018 | Adam et al. |
| 2018/0307236 | A1 * | 10/2018 | Reed ..................... G05D 1/0223 |
| 2019/0072973 | A1 | 3/2019 | Sun et al. |
| 2019/0202453 | A1 * | 7/2019 | Farooqi ............. B60W 50/0098 |
| 2019/0283748 | A1 | 9/2019 | Hajika et al. |
| 2019/0384294 | A1 | 12/2019 | Shashua et al. |
| 2019/0389470 | A1 | 12/2019 | Zarringhalam et al. |
| 2020/0079372 | A1 * | 3/2020 | Hajika .................. B60W 30/12 |
| 2020/0272835 | A1 | 8/2020 | Cheng et al. |
| 2020/0339079 | A1 | 10/2020 | Ohmura |
| 2020/0377088 | A1 | 12/2020 | Fukushige et al. |
| 2020/0379461 | A1 | 12/2020 | Singh et al. |
| 2021/0171042 | A1 | 6/2021 | Hayakawa et al. |
| 2021/0197858 | A1 | 7/2021 | Zhang et al. |
| 2021/0221364 | A1 | 7/2021 | Mase et al. |
| 2021/0229708 | A1 | 7/2021 | Kondo et al. |
| 2021/0366144 | A1 | 11/2021 | Magistri et al. |
| 2022/0082403 | A1 | 3/2022 | Shapira et al. |
| 2022/0089219 | A1 | 3/2022 | Takebayashi et al. |
| 2022/0097697 | A1 | 3/2022 | Wang et al. |
| 2022/0212670 | A1 | 7/2022 | Aoki et al. |
| 2022/0266852 | A1 | 8/2022 | Khayyer |
| 2022/0363250 | A1 * | 11/2022 | Varunjikar ........... B62D 15/025 |

FOREIGN PATENT DOCUMENTS

| | | | |
|---|---|---|---|
| CN | 109740469 B | 1/2021 | |
| DE | 10333670 B4 * | 7/2019 | ............... G01C 3/06 |
| EP | 3342666 A1 | 7/2018 | |
| EP | 3805073 A1 * | 4/2021 | ...... B60W 30/18163 |
| GB | 2550256 A | 11/2017 | |
| IN | 202014005110 A | 8/2020 | |
| JP | 2009-020854 A | 1/2009 | |
| JP | 5187171 B2 | 4/2013 | |
| JP | 2018-203173 A | 12/2018 | |
| JP | 2021-503414 A | 2/2021 | |
| WO | 2019099622 A1 | 5/2019 | |

OTHER PUBLICATIONS

Non-final Office Action dated Jan. 18, 2023, in connection with U.S. Appl. No. 17/305,701, 9 pages.
Bouhoute, Afaf, et al., "On the Application of Machine Learning for Cut-In Maneuver Recognition in Platooning Scenarios", 2020 IEEE 91st Vehicular Technology Conference (VTC2020-Spring), 2020, 5 pages.
Heinemann, Tonja, "Predicting Cut-Ins in Traffic Using a Neural Network", Master's thesis in Systems, Control and Mechatronics, Chalmers University of Technology, Department of Electrical Engineering, Gothenburg, Sweden, 2017, 62 pages.
Bar Hillel, Aharon, et al., "Recent Progress in Road and Lane Detection: A Survery", Machine Vision and Applications, Apr. 2014, 20 pages.
Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.
Narote, S.P., et al., "A Review of Recent Advances in Lane Detection and Departure Warning System", Pattern Recognition, vol. 73, Jan. 2018, 50 pages.
Non-final Office Action dated Sep. 29, 2022, in connection with U.S. Appl. No. 17/305,702, 13 pages.
International Search Report and Written Opinion of the International Search Authority dated Sep. 30, 2022, in connection with International Application No. PCT/US2022/037008, 7 pages.
International Search Report and Written Opinion of the International Search Authority dated Nov. 16, 2022, in connection with International Application No. PCT/US2022/037000, 8 pages.
International Search Report and Written Opinion of the International Search Authority dated Nov. 15, 2022, in connection with International Application No. PCT/US2022/037011, 8 pages.
International Search Report and Written Opinion of the International Search Authority dated Nov. 18, 2022, in connection with International Application No. PCT/US2022/037013, 9 pages.
International Search Report and Written Opinion of the International Search Authority dated Nov. 18, 2022, in connection with International Application No. PCT/US2022/037015, 8 pages.
International Search Report and Written Opinion of the International Search Authority dated Nov. 15, 2022, in connection with International Application No. PCT/US2022/037016, 9 pages.
Baek, et al., "Practical Approach for Developing Lateral Motion Control of Autonomous Lane Change System," Applied Sciences 2020, 10, 3143, Apr. 2020, 15 pages.
Lian et al. "Cornering Stiffness and Sideslip Angle Estimation Based on Simplified Lateral Dynamic Models for Four-In-Wheel-Motor-Driven Electric Vehicles with Lateral Tire Force Information," International Journal of Automotive Technology, vol. 16, No. 4, 2015, 15 pages.
Pereira, et al., "Cornering stiffness estimation using Levenberg-Marquardt approach," Inverse Problems in Science and Engineering, vol. 29, 2021—Issue 12, May 2021, 55 pages.

(56) References Cited

OTHER PUBLICATIONS

Sierra et al., "Cornering stiffness estimation based on vehicle later dynamics," Vehicle System Dynamics, vol. 44, Supplement, 2006, 15 pages.
Weon, et al., "Lane Departure Detecting with Classification of Roadway Based on Bezier Curve Fitting Using DGPS/GIS," Technical Gazette 28 1(2021), Feb. 2021, 8 pages.
Final Office Action dated Jun. 23, 2023, in connection with U.S. Appl. No. 17/305,701, 13 pages.
Notice of Allowance dated Jun. 29, 2023, in connection with U.S. Appl. No. 17/305,702, 9 pages.
Non-final Office Action dated Jun. 30, 2023, in connection with U.S. Appl. No. 17/305,705, 12 pages.
Notice of Allowance dated Aug. 7, 2023, in connection with U.S. Appl. No. 17/305,706, 6 pages.
Notice of Allowance dated Aug. 3, 2023, in connection with U.S. Appl. No. 17/305,702, 8 pages.
Non-final Office Action dated Aug. 24, 2023, in connection with United States U.S. Appl. No. 17/305,701, 12 pages.
Non-final Office Action dated Mar. 28, 2023, in connection with U.S. Appl. No. 17/305,704, 14 pages.
Non-final Office Action dated Mar. 30, 2023, in connection with U.S. Appl. No. 17/305,706, 12 pages.
Final Office Action dated Sep. 8, 2023, in connection with U.S. Appl. No. 17/305,704, 15 pages.
Notice of Allowance dated Oct. 18, 2023, in connection with U.S. Appl. No. 17/305,705, 11 pages.

\* cited by examiner

SYSTEM AND METHODS OF INTEGRATING VEHICLE KINEMATICS AND DYNAMICS FOR LATERAL CONTROL FEATURE AT AUTONOMOUS DRIVING

CROSS-REFERENCE TO RELATED APPLICATIONS

This application is related to the subject matter of: U.S. patent application Ser. No. 17,305,701 filed Jul. 13, 2021, and entitled SYSTEM AND METHOD IN THE PREDICTION OF TARGET VEHICLE BEHAVIOR BASED ON IMAGE FRAME AND NORMALIZATION; U.S. patent application Ser. No. 17,305,702 filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17,305,704 filed Jul. 13, 2021 and entitled SYSTEM AND METHOD IN VEHICLE PATH PREDICTION BASED ON FULL NONLINEAR KINEMATICS; U.S. patent application Ser. No. 17,305,705 filed Jul. 13, 2021 and entitled SYSTEM AND METHOD IN LANE DEPARTURE WARNING WITH FULL NONLINEAR KINEMATICS AND CURVATURE; U.S. patent application Ser. No. 17,305,706 filed Jul. 13, 2021 and entitled SYSTEM AND METHOD FOR LANE DEPARTURE WARNING WITH EGO MOTION AND VISION. The content of the above-identified patent documents is incorporated herein by reference.

TECHNICAL FIELD

This disclosure relates generally to vehicle driver assist or autonomous driving systems. More specifically, this disclosure relates to lateral control for path tracking.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Lateral control of a vehicle for path tracking, within the vehicle's ADAS or AD features, is improved in ways suitable to EVs having higher driving and handling performance, covering all driving ranges from static to highly dynamic maneuvering with better performance. To maintain vehicle travel within an occupied traffic lane during (for example) lane keeping, vehicle yaw rate is determined using a kinematics control and employed by a dynamics control to determine the steering angle needed. A steering actuator is activated, if necessary, based on the determined steering angle. A braking actuator may also be actuated based on the determined steering angle, depending on vehicle speed.

In one embodiment, an apparatus includes at least one camera configured to capture an image of a traffic lane in front of a vehicle. The apparatus also includes a path tracking controller configured to detect lane boundaries and a path curvature for the traffic lane from the image, determine a lateral offset of the vehicle from a reference path for the traffic lane and a heading offset for the vehicle from the path curvature, determine a yaw rate maintaining the vehicle within the traffic lane using a kinematics control, determine a steering angle maintaining the vehicle within the traffic lane using a dynamics control and the yaw rate determined by the kinematics control, and activate a steering control based on the determined steering angle.

The yaw rate $\omega_d$ maintaining the vehicle within the traffic lane may be determined from:

$$\omega_d = \frac{\eta}{v\cos(\theta)} + \frac{v\kappa\cos(\theta)}{1-\kappa r},$$

where $v$ is vehicle forward velocity, $\theta$ is a relative course angle based on the heading offset for the vehicle, $\kappa$ is the path curvature, $r$ is the lateral offset of the vehicle, and $\eta$ is feedback from the dynamics control. The determined steering angle may be derived from $\dot{\chi}=A_\chi+B_1 u+B_2\omega_d+B_3\sin(\phi)$, where $\dot{\chi}$ is the first derivative of $\chi=[e_1\ \dot{e}_1\ e_2\ \dot{e}_2]$, $e_1=r$ is the lateral offset of the vehicle, $\dot{e}_1$ is the first derivative of $e_1$, $e_2$ is a relative yaw angle of the vehicle, $\dot{e}_2$ is the first derivative of $e_2$, and A, $B_1$, $B_2$ and $B_3$ are parameters determined by one of pole placement or linear-quadratic regulation. The kinematics control may receive, as inputs, the lateral offset r of the vehicle from the reference path and the heading offset $\Delta\psi$ of vehicle heading from the path curvature. The dynamics control may receive, as inputs, the lateral offset r, the first derivative $\dot{r}$ of the lateral offset r, the heading offset $\Delta\psi$, and the first derivative $\Delta\dot{\psi}$ of the heading offset $\Delta\psi$. The dynamics control may output a steering angle $\delta_f$ to the steering control, and the steering control may be configured to generate a steering command.

The path tracking controller may be configured to generate a braking command based on a speed of the vehicle and the determined steering angle. The path tracking controller may be configured to generate the braking command when the speed of the vehicle exceeds a predetermined safety limit for the determined steering angle.

In another embodiment, a vehicle includes the apparatus and a motor configured to drive wheels of the vehicle. The vehicle also includes a chassis supporting axles on which the wheels are mounted. The steering control is configured to generate a steering command controlling the wheels based on the determined steering angle. The vehicle further includes a brake actuator configured to actuate brakes for one or more of the wheels, where the brake actuator is configured to receive a braking control signal based on an output of the path tracking controller. The vehicle may be an electric vehicle.

In still another embodiment, a method includes capturing an image of a traffic lane in front of a vehicle using at least one camera mounted on the vehicle. The method also includes detecting lane boundaries and a path curvature for the traffic lane from the image and determining a lateral offset of the vehicle from a reference path for the traffic lane and a heading offset for the vehicle from the path curvature. The method further includes determining a yaw rate maintaining the vehicle within the traffic lane using a kinematics control, determining a steering angle maintaining the vehicle within the traffic lane using a dynamics control and the yaw rate determined by the kinematics control, and activating a steering control based on the determined steering angle.

The yaw rate $\omega_d$ maintaining the vehicle within the traffic lane may be determined from:

$$\omega_d = \frac{\eta}{v\cos(\theta)} + \frac{v\kappa\cos(\theta)}{1-\kappa r},$$

where v is vehicle forward velocity, $\theta$ is a relative course angle based on the heading offset for the vehicle, $\kappa$ is the path curvature, r is the lateral offset of the vehicle, and $\eta$ is feedback from the dynamics control. The determined steering angle may be derived from $\dot{\chi}=A_\chi+B_1u+B_2\omega_d+B_3\sin(\phi)$, where $\dot{\chi}$ is the first derivative of $\chi=[e_1\ \dot{e}_1\ e_2\ \dot{e}_2]$, $e_1=r$ is the lateral offset of the vehicle, $\dot{e}_1$ is the first derivative of $e_1$, $e_2$ is a relative yaw angle of the vehicle, $\dot{e}_2$ is the first derivative of $e_2$, and A, $B_1$, $B_2$ and $B_3$ are parameters determined by one of pole placement or linear-quadratic regulation. The kinematics control may receive, as inputs, the lateral offset r of the vehicle from the reference path and the heading offset $\Delta\psi$ of vehicle heading from the path curvature. The dynamics control may receive, as inputs, the lateral offset r, the first derivative $\dot{r}$ of the lateral offset r, the heading offset $\Delta\psi$, and the first derivative $\Delta\dot{\psi}$ of the heading offset $\Delta\psi$. The dynamics control may output a steering angle $\delta_f$ to the steering control, and the steering control may generate a steering command.

The method may include generating a braking command based on a speed of the vehicle and the determined steering angle. The braking command may be generated when the speed of the vehicle exceeds a predetermined safety limit for the determined steering angle. The method may include driving wheels of the vehicle with a motor, generating a steering command controlling the wheels based on the determined steering angle, and generating a braking control signal based on the determined steering angle and a vehicle speed. The method may be performed within or by an electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

There are many lateral control features that are useful for ADAS and AD, including without limitation: lane centering, lane keeping, lane changing, and evasive steering assistance. Lateral controllers have often been designed based on kinematics or dynamics separately. As a result, kinematics-based controllers have not performed well in high dynamic maneuvers, such as where lateral acceleration is greater than about 5 meters per second squared (m/s$^2$). Kinematics-based controller designs typically employ linear/nonlinear kinematics-based control, pure-pursuit, or a Stanley method. Meanwhile, dynamics-based controllers may suffer performance issues in low-speed maneuvers, where dynamic effect is not very dominant. Dynamics-based controller designs often use a bicycle model based controller. This disclosure describes approaches for combining the above two governing principles in a single lateral acceleration controller to cover the entire driving regime, which may be particularly useful for performance handling vehicles.

Figure 1:
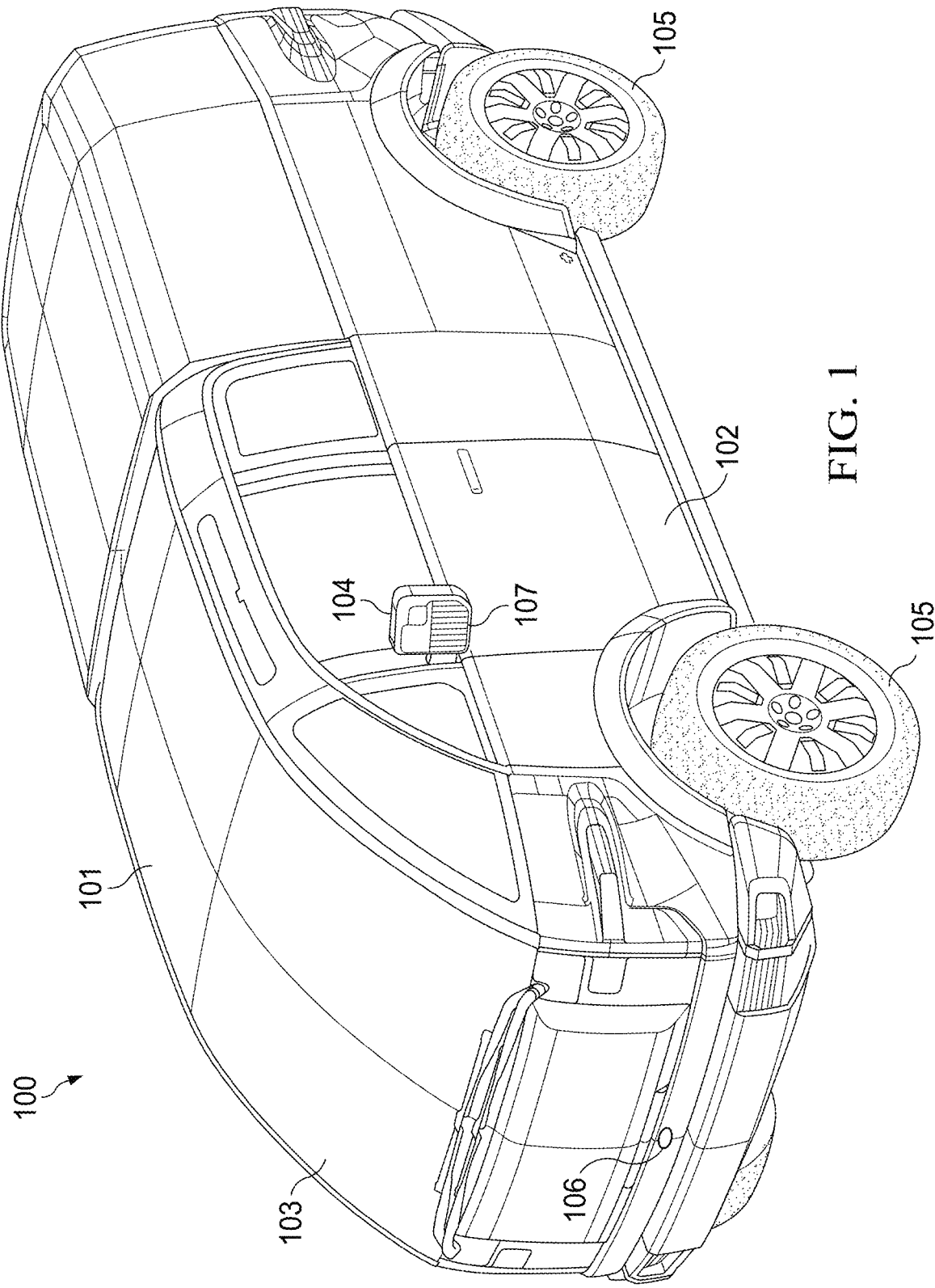
FIG. 1 is a perspective view of a vehicle within which improved lateral acceleration control is implemented in accordance with embodiments of the present disclosure.

FIG. 1 is a perspective view of a vehicle 100 within which improved lateral acceleration control is implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The front camera 106 and side cameras 107 provide images to the vehicle control system for use as part of ADAS and AD features as described below, and the images may optionally be displayed to the operator.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved lateral acceleration control described in this disclosure may be used with any other suitable vehicle.

Figure 2:
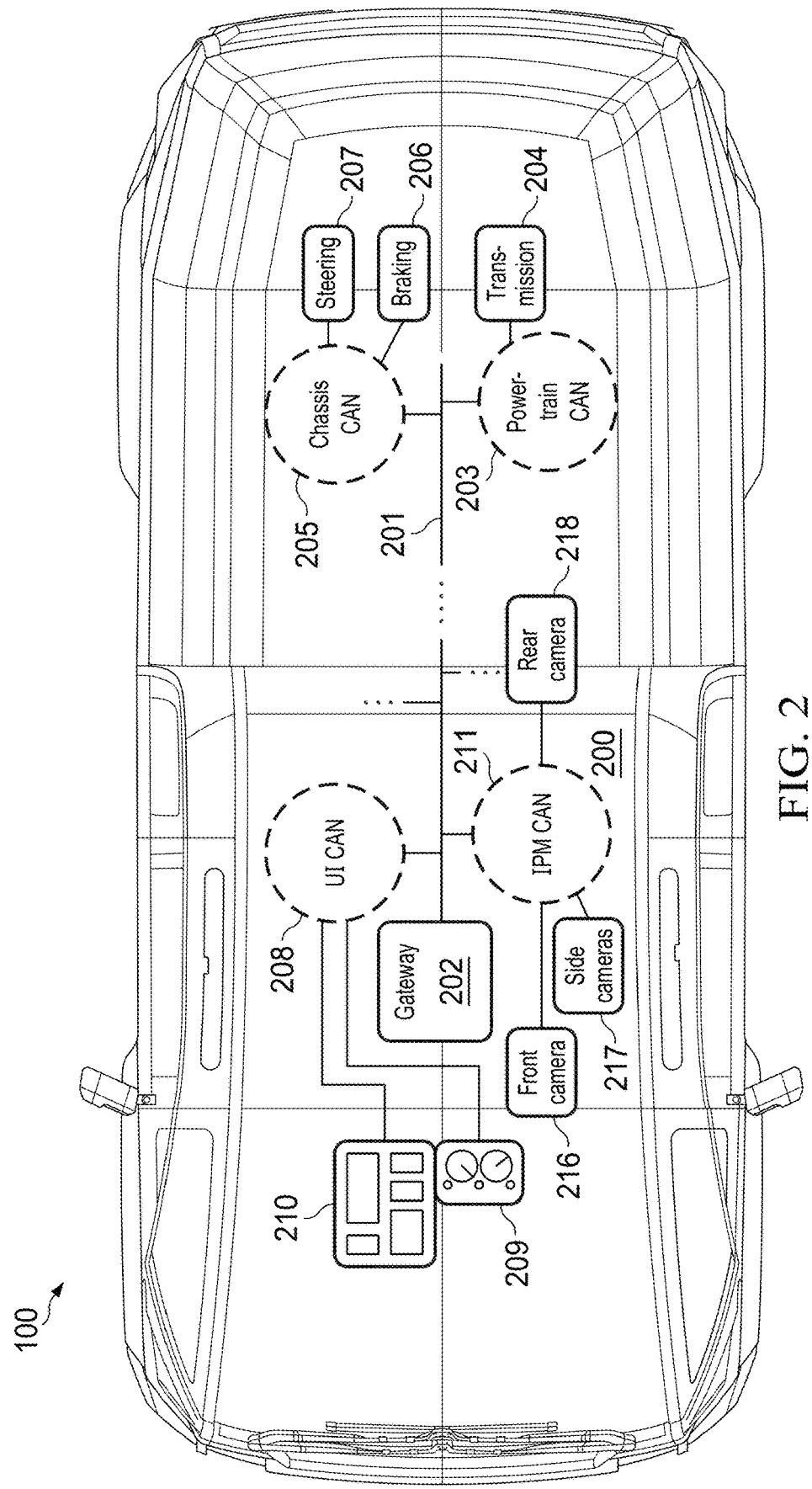
FIGS. 2 and 2A depict a vehicle control system for a vehicle within which improved lateral acceleration control is implemented in accordance with embodiments of the present disclosure.
Figure 2A:
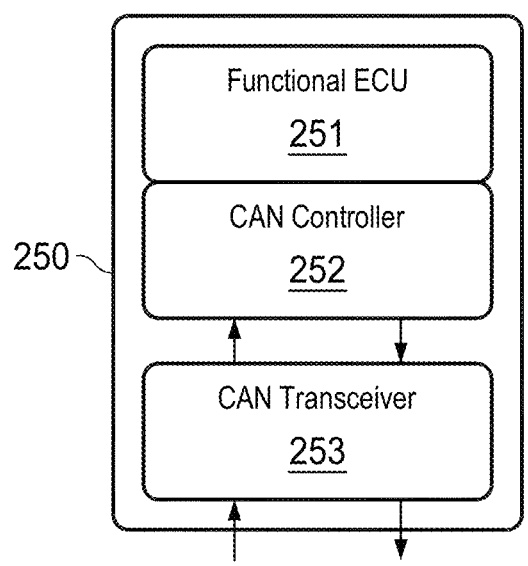

FIGS. 2 and 2A depict a vehicle control system 200 for a vehicle within which improved lateral acceleration control is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking and steering ECU 206 and a steering ECU 207 (for, e.g., controlling steering angle) are connected. The braking and steering ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the transparent windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU(s) 217, and rear camera ECU 218 are connected. The front camera ECU 216 receives image data from the front camera 106 on the vehicle 100, while the side camera ECU(s) 217 receives image data from each of the side cameras 107 and the rear camera ECU 218 receives image data from the rear camera.

In some embodiments, a separate ECU may be used for each camera, such that two side camera ECUs may be employed. The IPM CAN 211 and the front camera ECU 216, side camera ECU(s) 217, and rear camera ECU 218 process image data for use in vision-based ADAS features, such as providing a rear back-up camera display and/or stitching together the images to create a "bird's eye" view of the vehicle's surroundings.

FIG. 2A illustrates a high level block diagram for the architecture 250 of each CAN depicted in FIG. 2. Each CAN shown in FIG. 2, including the IPM CAN 211, includes a functional CAN ECU 251 for the specific function performed by the respective CAN (e.g., image processing in the case of IPM CAN 211). The functional CAN ECU 251 is coupled to a CAN processor/controller 252 that controls the interactions of the respective CAN with the other CANs within the vehicle 100 through the gateway ECU 202. A CAN transceiver 253 receives messages from and transmit messages to other CANs under the control of the CAN processor/controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding of the present disclosure is depicted and described. Various changes may be made to the example of FIGS. 2 and 2A, and the improved lateral acceleration control described in this disclosure may be used with any other suitable vehicle control system.

To support various ADAS functions such as lane keeping during high performance operation, the chassis CAN 205 for the vehicle 100 can control the steering angle and/or braking across a wide range of dynamic accelerations. In the present disclosure, a combination of kinematics-based and dynamics-based lateral acceleration control is implemented.

Figure 3:
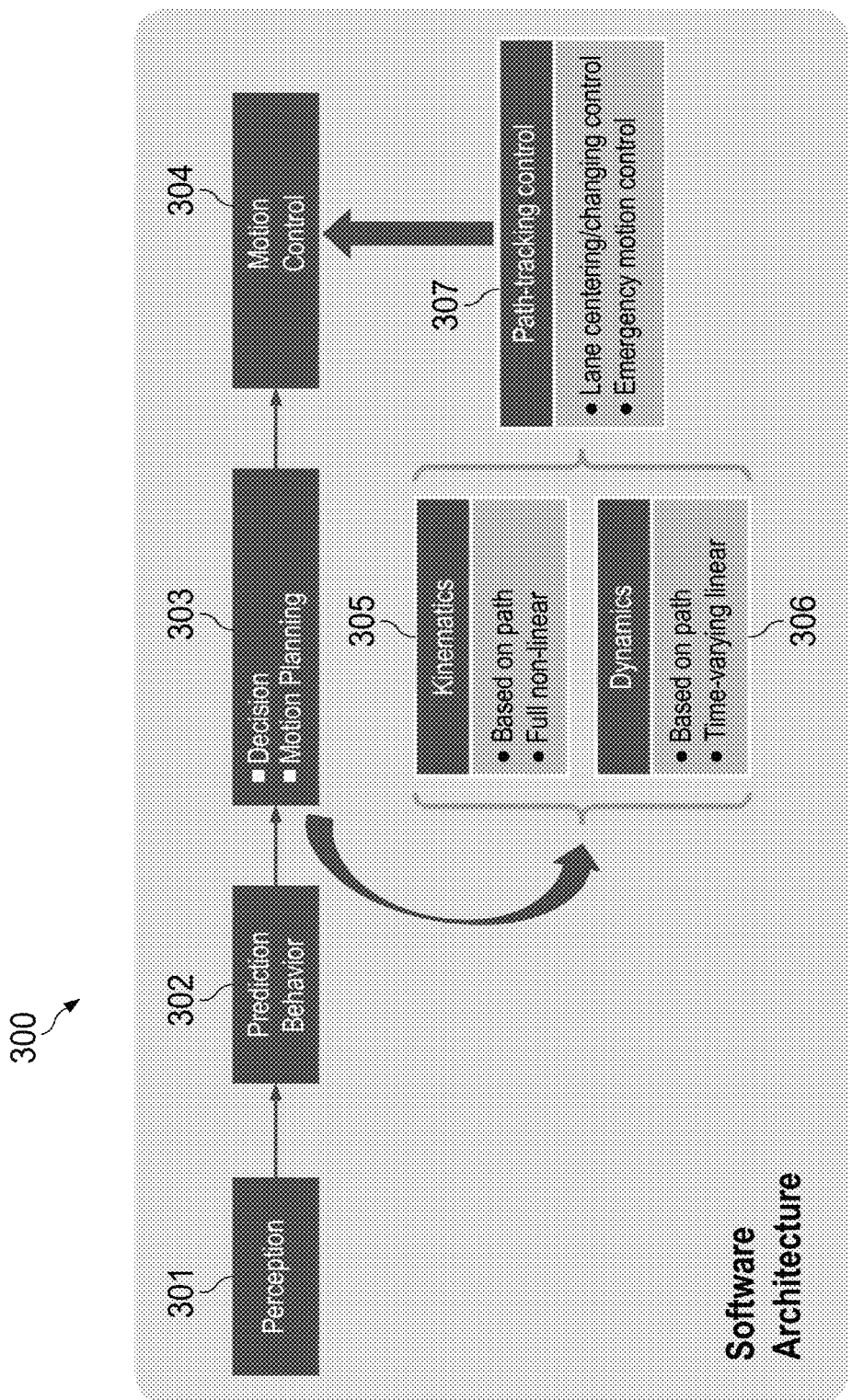
FIG. 3 illustrates a functional diagram of a system within a vehicle for performing improved lateral acceleration control in accordance with embodiments of the present disclosure.

FIG. 3 illustrates a functional diagram of a system 300 within a vehicle for performing improved lateral acceleration control in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by the chassis CAN 205 and the braking and steering ECUs 206, 207 in FIG. 2, including the functional (CAN) ECU 251, CAN processor/controller 252, and CAN transceiver 253 for chassis CAN 205 depicted in FIG. 2A. Lane detection for the system 300 in FIG. 3 may be implemented in accordance with any suitable technique using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 for IPM CAN 211 depicted in FIG. 2A. Specific functions depicted in FIG. 3 may be distributed among those components.

To support ADAS and AD features, the system 300 includes the functions of camera perception 301, ego vehicle behavior prediction 302 (where "ego" refers to the vehicle implementing the ADAS and/or AD feature(s)), decision and motion planning 303, and motion control 304. Camera perception 301 detects a traffic lane ahead, while vehicle behavior prediction 302 determines the speed at which and a lane position in which the ego vehicle will likely enter an upcoming curve in that traffic lane. Decision and motion planning 303 and motion control 304 respectively determine and, if necessary, implement reactive responses to the ego vehicle's entry into the traffic lane curve, such as steering and/or emergency braking.

Decision and motion planning 303 implements at least kinematics-based vehicle modeling 305 based on the projected path determined by the behavior prediction 302 and full non-linear kinematics, as well as dynamics-based vehicle modeling 306 based on the projected path and time-varying linear dynamics. The outputs of the kinematics-based vehicle modeling 305 and the dynamics-based vehicle modeling 306 are used by the motion control 304 in a path-tracking control 307, which may include one or both of lane centering and/or changing control and emergency motion control.

The kinematics-based vehicle modeling 305 and the dynamics-based vehicle modeling 306 are integrated in a way such that the two control regimes are in a cascade connection. The kinematics-based vehicle modeling 305 provides the desired yaw rate ($\omega_d$) to the dynamics-based vehicle modeling 306, which outputs final control of steering wheel angle ($\delta_f$) and/or braking to the vehicle's physical control systems. The inputs to both the kinematics-based vehicle modeling 305 and the dynamics-based vehicle modeling 306 from the vehicle vision system include lateral offset (r) from the lane boundary, the derivative ($\dot{r}$) of the lateral offset, a vehicle heading offset ($\Delta\psi$), and the derivative ($\Delta\dot{\psi}$) of the vehicle heading offset.

Figure 4:
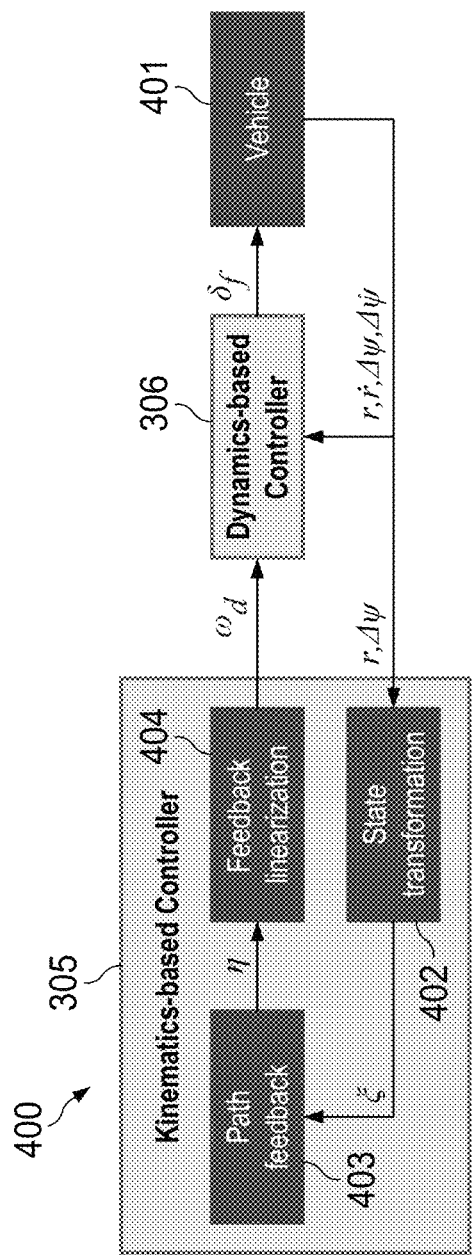
FIG. 4 illustrates a high level block diagram of a lateral acceleration controller within a vehicle performing improved lateral acceleration control in accordance with embodiments of the present disclosure.

FIG. 4 illustrates a high level block diagram of a lateral acceleration controller 400 within a vehicle performing improved lateral acceleration control in accordance with embodiments of the present disclosure. The embodiment of the lateral acceleration controller 400 illustrated in FIG. 4 is for illustration and explanation only. FIG. 4 does not limit the scope of this disclosure to any particular implementation.

The kinematics-based vehicle modeling 305 of the lateral acceleration controller 400 in FIG. 4 outputs the desired yaw rate $\omega_d$ to the dynamics-based vehicle modeling 306 of that lateral acceleration controller 400. The dynamics-based vehicle modeling 306 outputs the desired steering wheel angle $\delta_f$ to other vehicle controls 401, which include motion control 304, IPM CAN 211 for the vision system, and chassis CAN 205, and optionally other sensors such as an inertial measurement unit (IMU). The other vehicle controls 401 provide updated values for the vehicle lateral offset r, the lateral offset derivative $\dot{r}$, the vehicle heading offset $\Delta\psi$, and the vehicle heading offset derivative $\Delta\dot{\psi}$, all of which are received by the dynamics-based vehicle modeling 306. Updated values for the vehicle lateral offset r and the vehicle heading offset $\Delta\psi$ are received by the kinematics-based vehicle modeling 305 for state transformation 402. The state transformation 402 provides an input $\xi$ (discussed below) to path feedback 403 within the kinematics-based vehicle modeling 305, and the path feedback 403 provides an input $\eta$ (also discussed below) to feedback linearization 404, which outputs the desired yaw rate $\omega_d$.

Kinematics-Based Control

Figure 5:
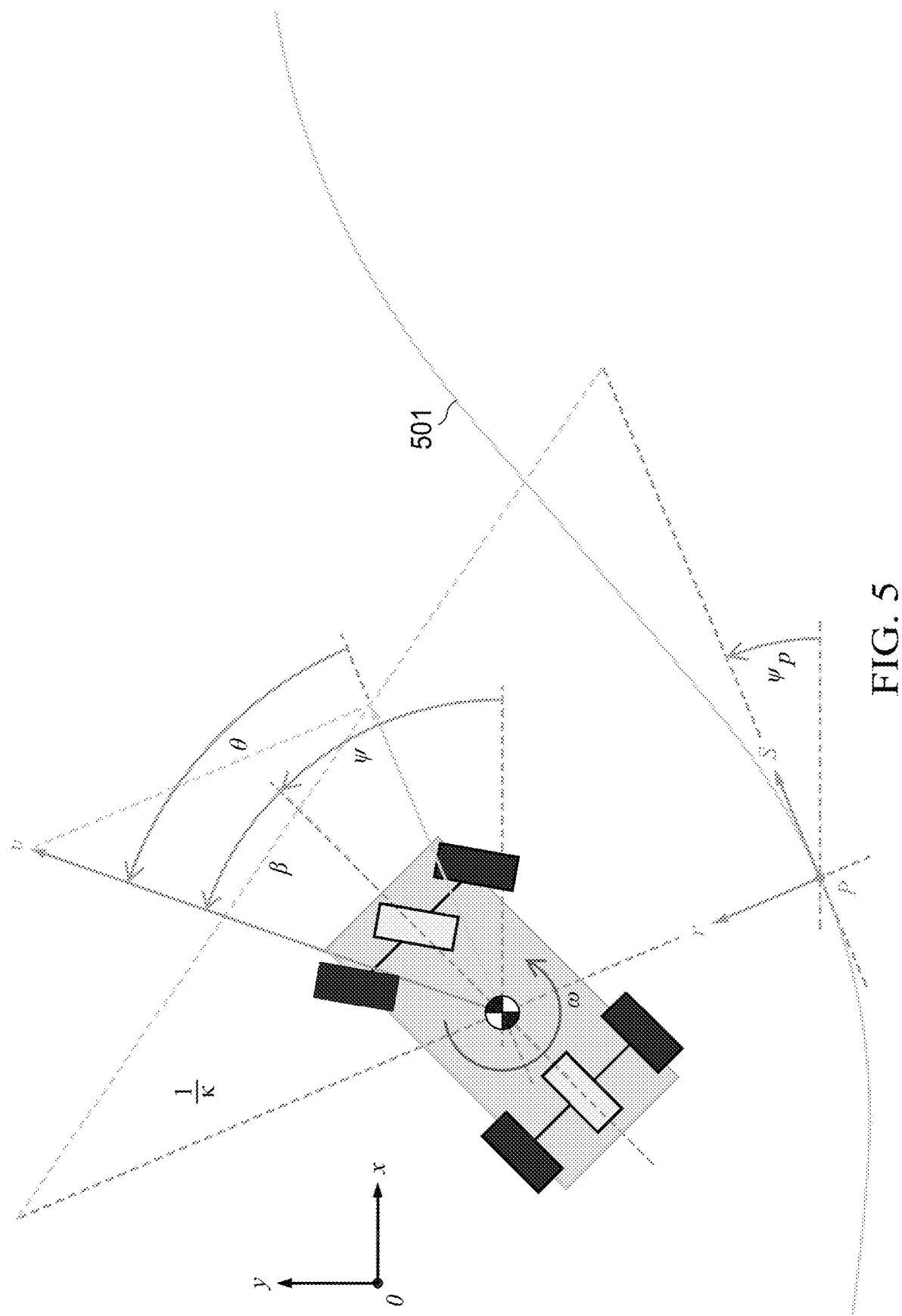
FIG. 5 illustrates a diagram for vehicle kinematics in accordance with embodiments of the present disclosure.

In some embodiments, Frenet coordinates may be used for the kinematics-based vehicle modeling 305. FIG. 5 illustrates a diagram for vehicle kinematics, in Frenet coordinates, with respect to a vehicle center of gravity C in accordance with embodiments of the present disclosure. By projecting a reference point onto a reference path 501 (e.g., the lane center) and introducing a Frenet coordinate frame (P,s,r) at the projection point P, the vehicle kinematics may be described relative to the reference path. There are different common projection methods that may be used here. In some embodiments, an orthogonal projection defines the projection point P such that the connecting line between C and P is orthogonal to the tangent to the path in P. In other embodiments, a parallel projection defines the projection point P by the intersection of the reference path with the y-axis of the ego vehicle coordinate frame. While the parallel projection is easier to compute, the orthogonal projection may have certain advantages. For example, since orthogonal projection is invariant to vehicle rotation, the projection point monotonically travels along the path as long as the vehicle velocity v is positive. Therefore, orthogonal projection may be used in the following, although this is for illustration only and can vary.

The vehicle 100 travels exactly along the path if the reference point lies on the path and the velocity vector is tangent to the path. Therefore, the relative course angle $\theta=\beta+\psi-\psi_p$ is introduced, where $\beta$ is side-slip angle of the ego vehicle, $\psi$ is the orientation of the ego vehicle's velocity vector relative to the x-axis of the ego vehicle coordinate frame, and $\psi_p$ is the orientation of the path at the projection point P. The vehicle kinematics may be described by:

$$\dot{s} = \frac{v\cos(\theta)}{1-\kappa r} \quad s(0) = s_0 \quad (1)$$
$$\dot{r} = v\sin(\theta) \quad r(0) = r_0$$
$$\dot{\theta} = \dot{\beta} + \omega - \frac{v\kappa\cos(\theta)}{1-\kappa r} \quad \theta(0) = \theta_0$$

where $\kappa$ is the curvature of the reference path at the projection point P. The curvature $\kappa$ is defined as the derivative of the orientation with respect to the travelled distance along the path and may be interpreted as the reciprocal of the local curve radius.

The first differential equation (for $\dot{s}$) in equation set (1) describes how fast the vehicle moves along the reference path, which is determined by taking the fraction of the velocity tangent to the path (i.e., $v\cos(\theta)$) and applying the rule of three. The first differential equation plays an important role in deriving the dynamics but is usually ignored in lateral motion control. This indicates one benefit of using Frenet coordinates in lateral control, namely that the number of relevant differential equations can be reduced.

For feedback linearization, the motion control tasks can be greatly simplified when describing vehicle motion in Frenet coordinates, as only the lateral offset r from the s-axis may need to be regulated. To account for nonlinear kinematics, feedback linearization can be used. For feedback linearization in general, one starts by defining the controlled output z and deriving the output with respect to time until the control input u appears in the equation.

For moderate curvature changes as can be expected on highways, the path dynamics are much slower than the vehicle dynamics. To simplify the design, the vehicle dynamics can be neglected in this step. Instead, the side-slip angle may be treated as a known, time-varying parameter similar to the longitudinal velocity.

By defining the lateral offset as a controlled output, the first three derivatives read:

$$z = r \quad (2)$$
$$\dot{z} = \dot{r} = v\sin(\theta)$$
$$\ddot{z} = v\cos(\theta)\dot{\theta} = v\cos(\theta)\left(\dot{\beta}+\omega-\frac{v\kappa\cos(\theta)}{1-\kappa r}\right)^{\dot{\beta}=0} = v\cos(\theta)\left(\omega-\frac{v\kappa\cos(\theta)}{1-\kappa r}\right)$$

where $\omega$ is ego vehicle yaw and the last term in the last differential equation above assumes that $\dot{\beta}=0$. Equating the last equation in equation set (2) with the virtual input $\eta$ to the feedback linearization 404 and solving for the yaw rate yields the feedback linearizing control:

$$\omega_d = \underbrace{\frac{\eta}{v\cos(\theta)}}_{feedback} + \underbrace{\frac{v\kappa\cos(\theta)}{1-\kappa r}}_{feedforward} \quad (3)$$

As annotated above, the first term can be considered the feedback term based on offsets from the path, and the second term is the feedforward part and is dependent on the path's curvature.

For path feedback control, the feedback linearization yields in the double-integrator $\ddot{z}=\eta$, with the integrator states:

$$\xi = \begin{bmatrix} z \\ \dot{z} \end{bmatrix} = \begin{bmatrix} r \\ \dot{r} \end{bmatrix} = \begin{bmatrix} r \\ v\sin(\theta) \end{bmatrix} \quad (4)$$

Since a double integrator is a second-order system, the control performance may be defined in terms of settling time $t_s$ and overshoot $y_p$. With $\eta=-k_0 z - k_1 \dot{z}$, the closed-loop differential equation reads:

$$\ddot{z}+k_1\dot{z}+k_0 z=0 \quad (5)$$

By comparing the system to the common representation of second-order systems in terms of natural frequency $\omega_0$ and damping ratio $\zeta$:

$$\ddot{z}+2\zeta\omega_0\dot{z}+\omega_0^2 z(s)=0 \quad (6)$$

the gains can be expressed as:

$$k_0=\omega_0^2$$

$$k_1=2\zeta\omega_o \quad (7)$$

To compute the gains, the natural frequency and damping ratio can be related to the performance criteria. In the underdamped case, i.e., $\zeta<1$, the following equations hold true:

$$t_s = -\frac{\ln\left(\epsilon\sqrt{1-\zeta^2}\right)}{\zeta\omega_0} \quad (8)$$

$$y_p = \exp\left(-\frac{\zeta\pi}{\sqrt{1-\zeta^2}}\right)$$

where the parameter $\epsilon$ specifies the width of the settling window. For example, for $\epsilon=0.02$, the settling time is defined as the time after which the lateral error does not deviate more than 2% from the desired value. Hence, given the desired settling time and overshoot:

$$\zeta = \sqrt{\frac{\ln(y_p)^2}{\pi^2 + \ln(y_p)^2}} \tag{9}$$

$$\omega_0 = -\frac{\ln(\epsilon\sqrt{1-\zeta^2})}{\zeta d_s}$$

In the critically damped case, i.e., $\zeta$1, the following relation holds for the natural frequency:

$$\epsilon = (1-\omega_0 d_s) e^{-\omega_0 d_s}.$$

Numerically solving the above equation for $\epsilon = 0.02$ gives:

$$\omega_0 = \frac{5.833756}{t_s}. \tag{10}$$

In the kinematics-based control, the desired yaw rate ($\omega_d$) can be calculated from the feedback linearization with nonlinear kinematic, and the steering wheel angle command (swa$_{cmd}$) can be calculated with proportional integral (PI) control:

$$swa_{cmd} = K_p(\omega - \omega_d) - K_i \int(\omega - \omega_d).$$

However, in the present disclosure, the final steering wheel angle command will not be like the above when the kinematics are combined with the following dynamics.

Dynamics-Based Control (With Respect to Path Coordinate)

Figure 6:
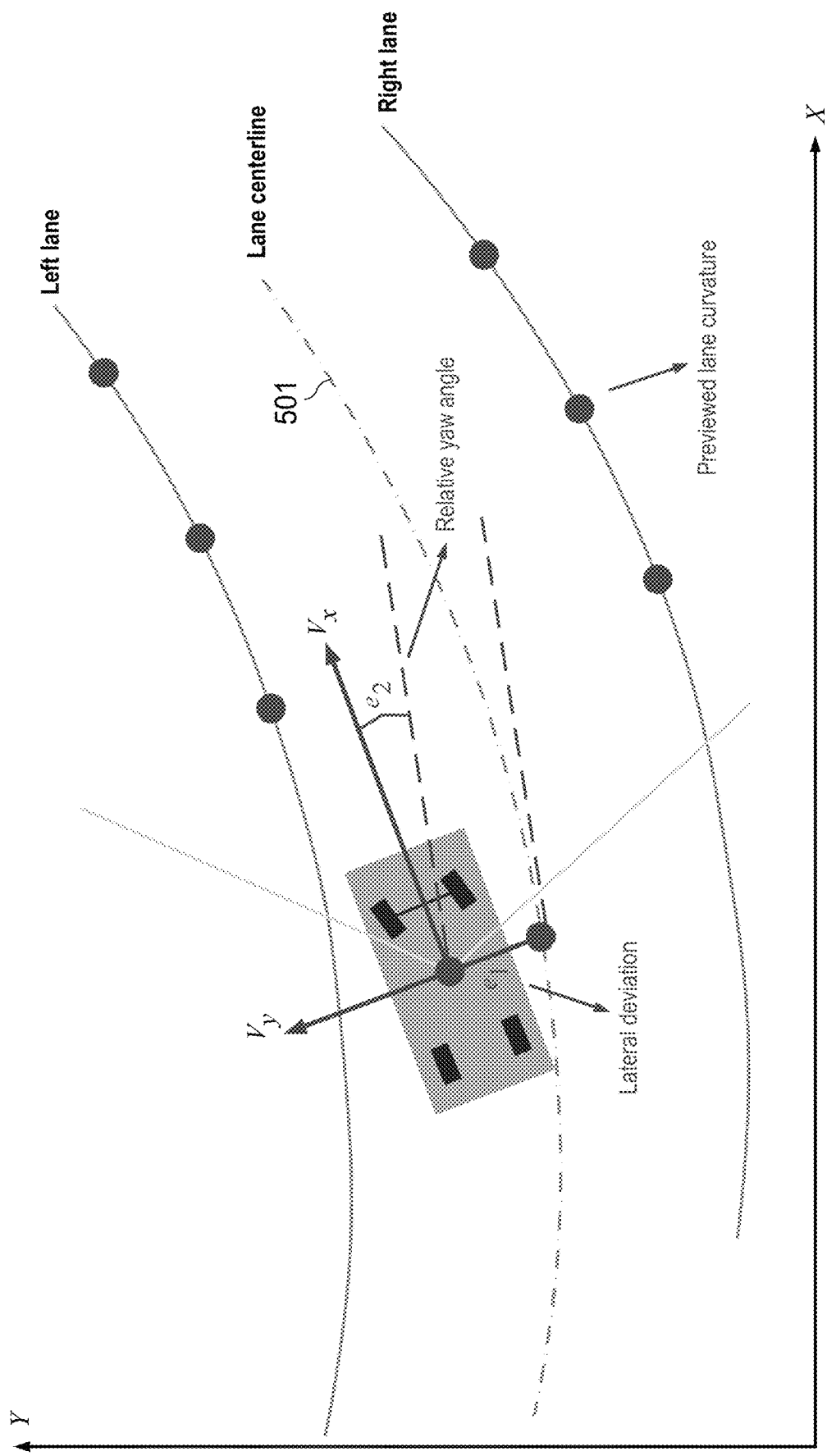
FIG. 6 illustrates a bicycle dynamic model for a vehicle and representation of the vehicle with respect to path coordinates in accordance with embodiments of the present disclosure.

FIG. 6 illustrates a bicycle dynamic model for the vehicle 100 and representation of the vehicle with respect to path coordinates. For a vehicle 100 with velocities $V_x$ and $V_y$ as shown in FIG. 6, the following state space model can be derived from the bicycle dynamic model with respect to path coordinates:

$$\dot{\chi} = A\chi + B_1 u + B_2 \dot{\psi}_{des} + B_3 \sin\phi,$$

where $e_1 = r$ is lateral deviation from the reference path (still the lane centerline), $e_2 = \Delta\psi$ is the relative yaw angle, $\omega = [e_1\ \dot{e}_1\ e_2\ \dot{e}_2]$, $u = \delta_f$, g is gravitational acceleration, $\phi$ is the bank angle, and:

$$\frac{d}{dt}\begin{bmatrix}e_1\\\dot{e}_1\\e_2\\\dot{e}_2\end{bmatrix} = \underbrace{\begin{bmatrix}0 & 1 & 0 & 0\\0 & \frac{-2(C_f+C_r)}{mv_x} & \frac{2(C_f+C_r)}{m} & \frac{2(-l_f C_f + l_r C_r)}{mv_x^2}\\0 & 0 & 0 & 1\\0 & \frac{2(-l_f C_f + l_r C_r)}{I_z v_x} & \frac{2(l_f C_f - l_r C_r)}{I_z} & \frac{-2(l_f^2 C_f + l_r^2 C_r)}{I_z v_x}\end{bmatrix}}_{A} \tag{11}$$

$$\begin{bmatrix}e_1\\\dot{e}_1\\e_2\\\dot{e}_2\end{bmatrix} + \underbrace{\begin{bmatrix}0\\\frac{2\cdot C_f}{m}\\0\\\frac{2\cdot l_f \cdot C_f}{I_z}\end{bmatrix}}_{B_1}\delta_f + \underbrace{\begin{bmatrix}0\\\frac{2(-l_f C_f + l_r C_r)}{mv_x}\\0\\\frac{-2(l_f^2 C_f + l_r^2 C_r)}{I_z v_x}\end{bmatrix}}_{B_2}\dot{\psi}_{des} + \underbrace{\begin{bmatrix}0\\g\\0\\0\end{bmatrix}}_{B_3}\sin(\phi)$$

where $C_f$ and $C_r$ are, respectively, front and rear tire cornering stiffness; $l_f$ and $l_r$ are respectively front and rear wheelbase length; m and $I_z$ are, respectively, translational and rotational mass inertia; and $v_x$ is the vehicle's forward velocity/speed.

The model-based yaw rate controller of the present disclosure can use the system model represented at a path coordinate and replace $\dot{\psi}_{des}$ with $\omega_d$ so that the yaw rate controller uses four states of lateral/heading offset and their derivatives. With the term substitutions indicated by the annotations above, the final form of the controller can be expressed as:

$$\dot{\chi} = A\chi + B_1 u + B_2 \dot{\psi}_{des} + B_3 \sin(\phi) \rightarrow \dot{\chi} = A\chi + B_1 u + B_2 \omega_d + B_3 \sin(\phi) \tag{12}$$

where $\dot{\psi}_{des}$ can be simply expressed as $v_x/R$ with vehicle speed and road curvature without any consideration of kinematics of the vehicle at the road, whereas $\omega_d$ is output from the kinematics-based controller. The substitution thus takes advantage of full nonlinear kinematics and the vision signals of lateral/heading offset and road curvature.

The final control effort for the steering wheel angle can be found by any linear or nonlinear controller design with the cascade connection of kinematics and dynamics. For example, either pole placement or linear-quadratic regulation (LQR) may be employed.

Performance Comparison

Figure 7A:
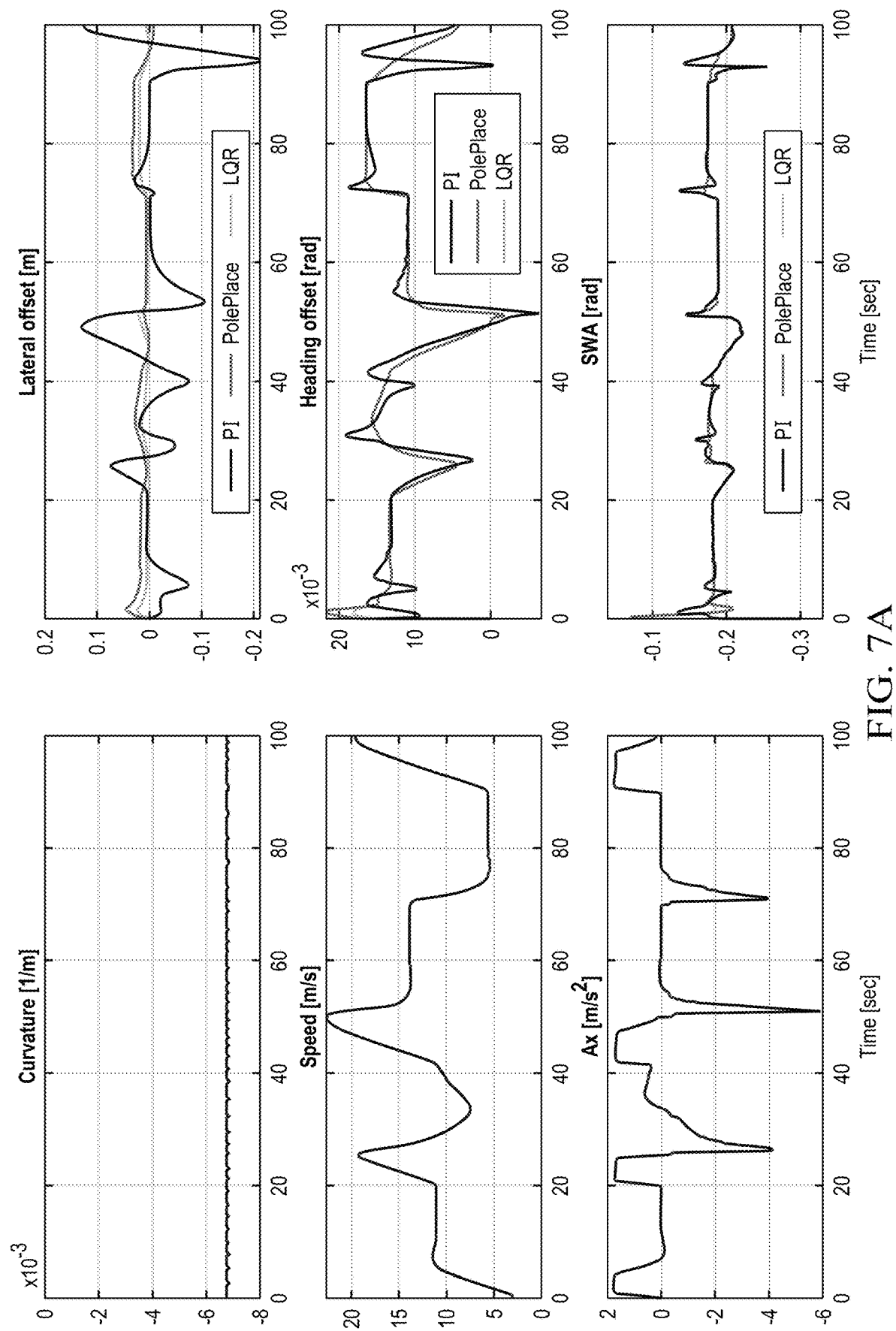
FIGS. 7A through 7C depict comparative simulation plots of a kinematics-only based controller with a combined, cascade-connection kinematics and dynamics controller in accordance with the present disclosure.
Figure 7B:
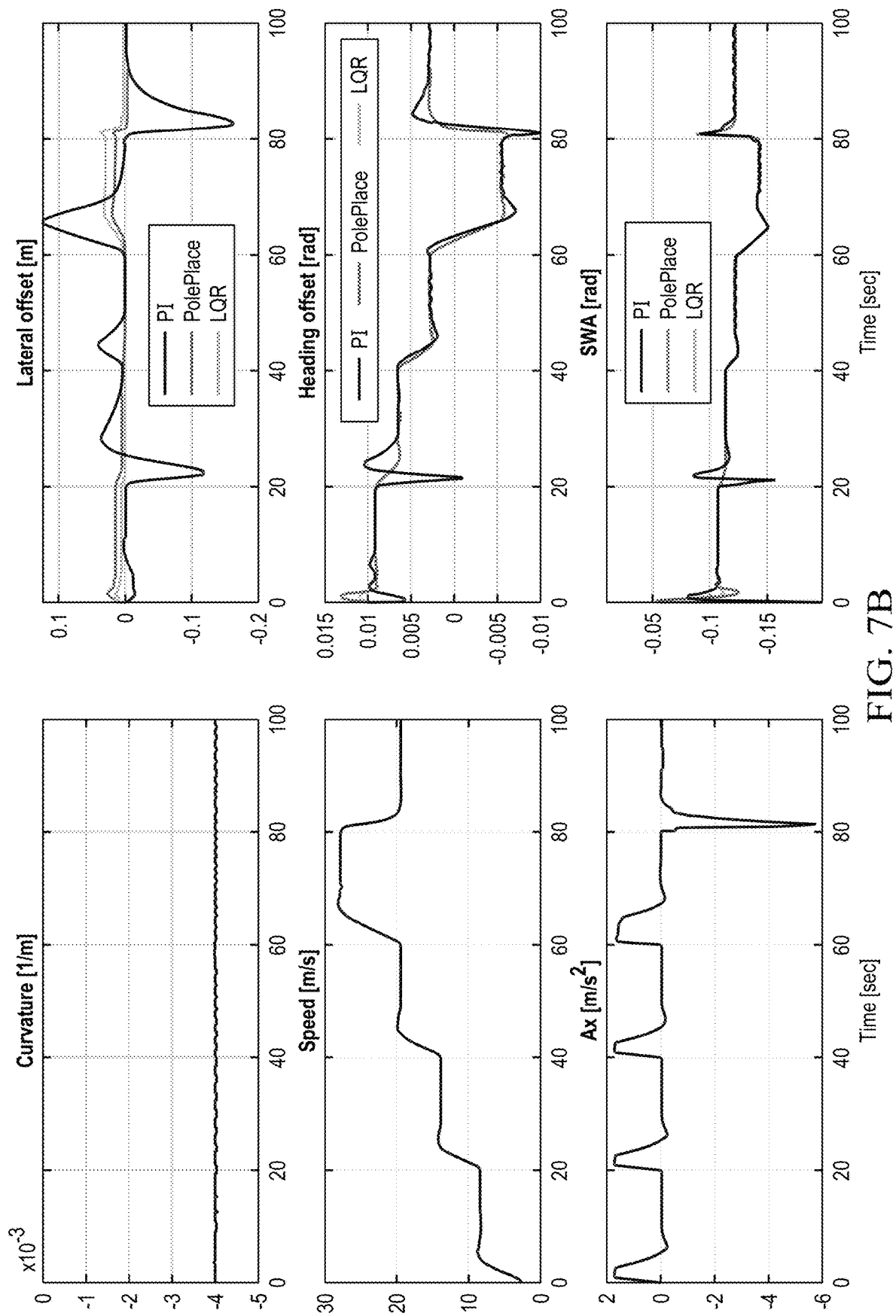
Figure 7C:
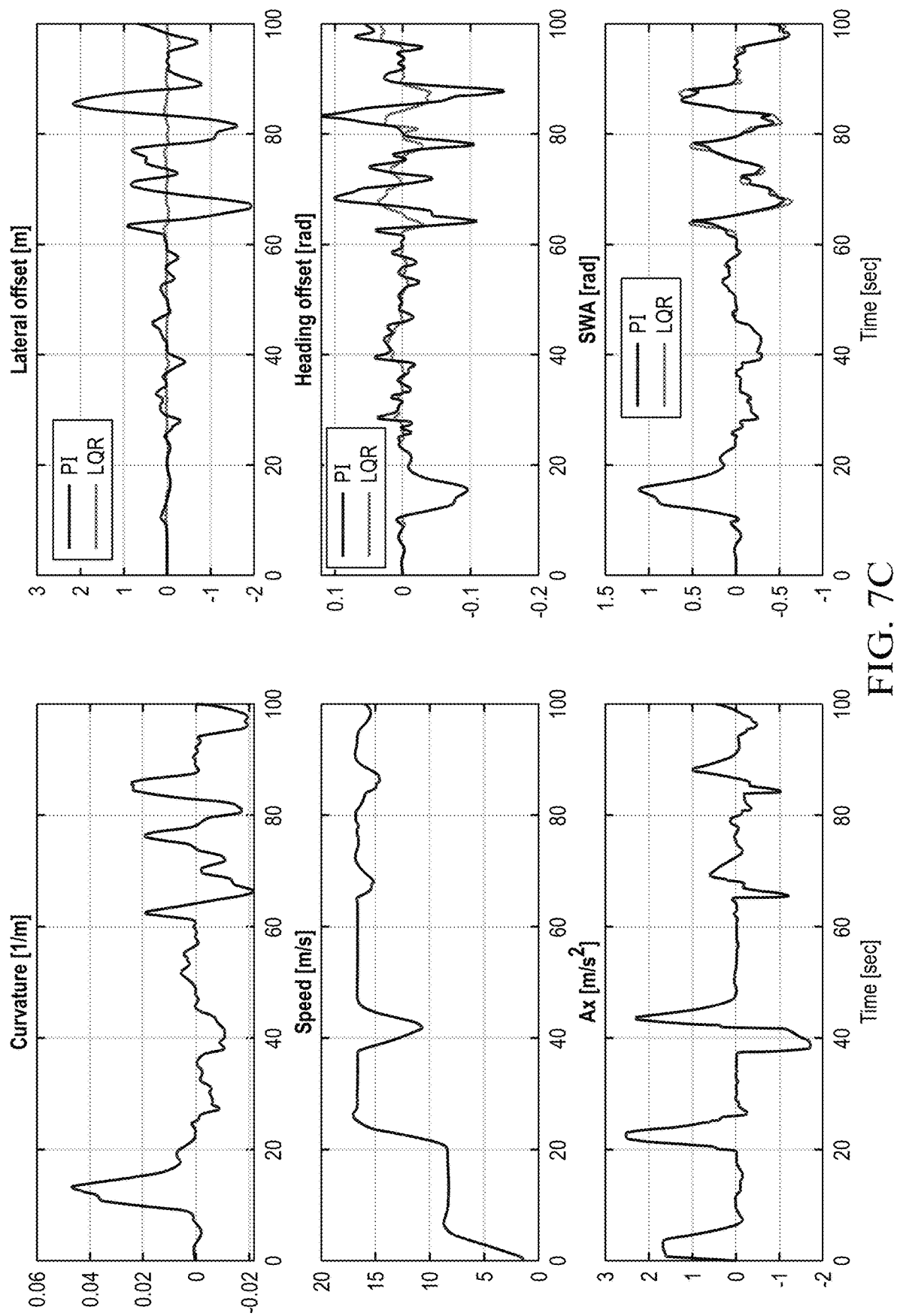

FIGS. 7A through 7C depict comparative simulation plots of a kinematics-only based controller (PI control) with a combined, cascade-connection kinematics and dynamics controller in accordance with the present disclosure. Three scenarios are represented by FIGS. 7A through 7C, with the first two comparing PI control to both kinematics and dynamics control using either pole placement ("PolePlace") or LQR and the last comparing PI control to both kinematics and dynamics control using LQR.

Representative signals of environment are in the left column of each of FIGS. 7A through 7C, while corresponding signals related to performance are in the right column, all plotted as a function of time. The top left plot in each of FIGS. 7A through 7C is road curvature in units of m$^{-1}$; the middle left plot is vehicle speed in units of m/s; and the bottom left plot is vehicle acceleration in the x-direction in units of m/s$^2$. The top right plot in each of FIGS. 7A through 7C is the vehicle lateral offset in units of m; the middle right plot is the vehicle heading offset in units of radians (rad); and the bottom right plot is steering wheel angle command swa in units of radians.

In FIG. 7A, curvature is constant while acceleration is intermittently positive or negative. In FIG. 7B curvature is constant while acceleration is periodically changed, positively four times and then negatively once. In FIG. 7C, curvature and acceleration both vary randomly. In FIGS. 7A through 7C, smaller lateral offset, heading offset, and steering wheel angle correspond to better performance. The simulations for the three scenarios demonstrate that the proposed controller combining both kinematics and dynamics performs better.

Figure 8:
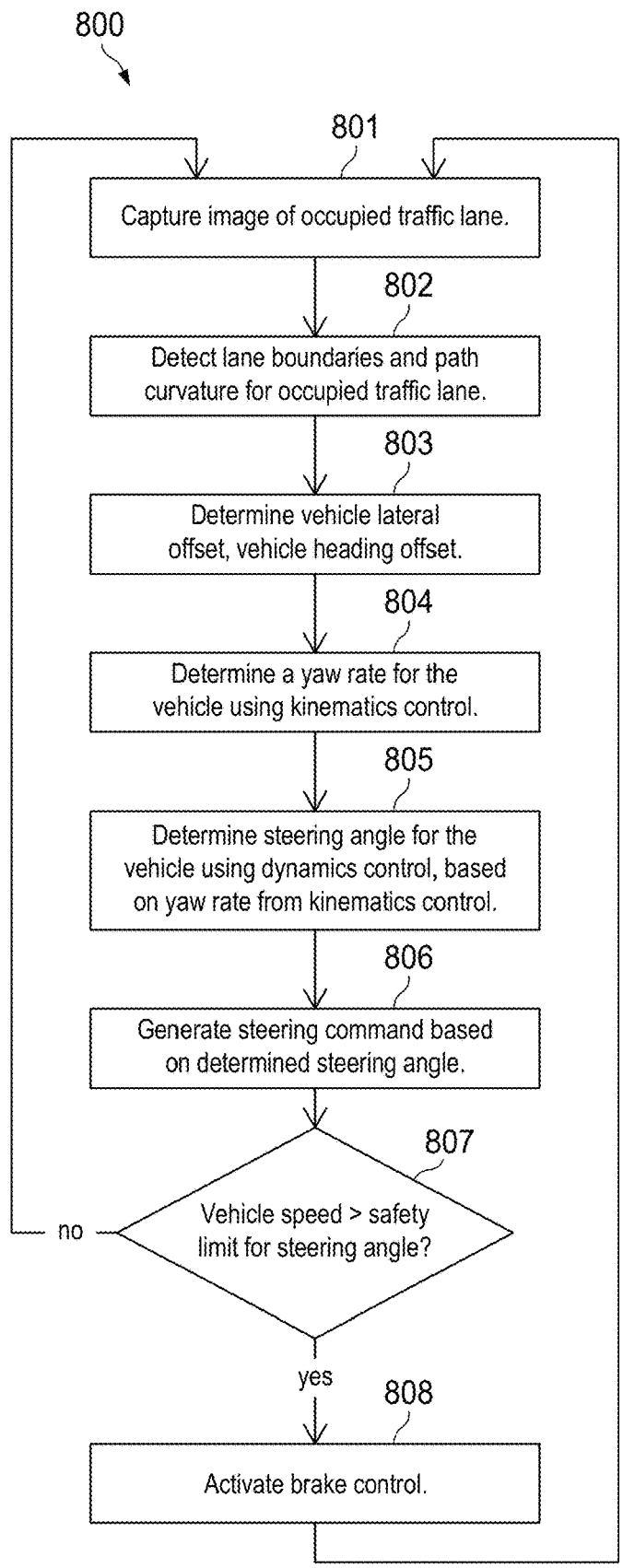
FIG. 8 illustrates a high level flow diagram for a process of improved lateral acceleration control in accordance with embodiments of the present disclosure.

FIG. 8 illustrates a high level flow diagram for a process of improved lateral acceleration control in accordance with embodiments of the present disclosure. The embodiment of the process 800 illustrated in FIG. 8 is for illustration and explanation only. FIG. 8 does not limit the scope of this disclosure to any particular implementation. In some embodiments, the process 800 in FIG. 8 may be implemented using the chassis CAN 205 and the braking and steering ECUs 206, 207 in FIG. 2, including the functional (CAN) ECU 251, CAN processor/controller 252, and CAN transceiver 253 for chassis CAN 205 depicted in FIG. 2A, and by using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 for IPM CAN 211 depicted in FIG. 2A. The process 800 may be implemented using the functions depicted in FIG. 3.

The example of process 800 illustrated in FIG. 8 includes capturing at least one image of a traffic lane occupied by a vehicle using at least one camera mounted on the vehicle (step 801). This may involve capturing images using a front camera 106 and one or both side cameras 107 and "stitching" those images together to form a panoramic field of view encompassing up to 180°. Lane boundaries and path curvature for the occupied lane are detected within the image (step 802) using any suitable technique. A vehicle lateral offset r from a reference path for the lane (which may be a lane centerline, one of the lane boundaries, or a different reference path selected based on road conditions) and a vehicle heading offset $\Delta\psi$ from the path curvature are determined (step 803) using any suitable technique from the image and/or other sensor data.

A kinematics control (e.g., kinematics-based vehicle modeling 305) is used to determine the yaw rate needed to maintain vehicle travel along the reference path (step 804) using the vehicle lateral offset r and the vehicle heading offset $\Delta\psi$. Using the yaw rate determined by the kinematics control, a dynamics control (e.g., dynamics-based vehicle modeling 306) determines a steering angle necessary to maintain vehicle travel along the reference path (step 805) using the yaw rate from the kinematics control. A steering control (e.g., steering ECU 207) receives the steering angle determined by the dynamics control and generates a steering command (step 806), which is used to provide steering assistance for lane keeping and/or lane centering.

Optionally, the process may include a check of whether the vehicle speed (determined, for example, from the input signal for the speedometer within the dashboard ECU 209) exceeds a safety limit corresponding to the steering angle determined by the dynamics control (step 807). If not, another iteration of the process is started. If so, the process activates a brake control (step 808) or illuminates a warning indicator until the vehicle speed is sufficiently reduced, and another iteration of the process is started.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one camera configured to capture an image of a traffic lane in front of a vehicle; and
   a path tracking controller configured to:
   detect lane boundaries and a path curvature for the traffic lane from the image,
   determine a lateral offset of the vehicle from a reference path for the traffic lane and a heading offset for the vehicle from the path curvature,
   using a kinematics control, determine a yaw rate that will maintain the vehicle within the traffic lane based on one or more of a vehicle forward velocity, a relative course angle based on a heading offset for the vehicle, the path curvature, the lateral offset of the vehicle, or feedback from a dynamics control,
   using the dynamics control and the yaw rate determined by the kinematics control, determine a steering angle that will maintain vehicle within the traffic lane, and
   activate a steering control based on the determined steering angle.

2. The apparatus according to claim 1, wherein the yaw rate $\omega_d$ maintaining the vehicle within the traffic lane is determined from:

$$\omega_d = \frac{\eta}{v\cos(\theta)} + \frac{v\kappa\cos(\theta)}{1-\kappa r},$$

where v is the vehicle forward velocity, $\theta$ is the relative course angle based on the heading offset for the vehicle, $\kappa$ is the path curvature, r is the lateral offset of the vehicle, and $\eta$ is the feedback from the dynamics control.

3. The apparatus according to claim 2, wherein the determined steering angle is derived from:

$$\dot{\chi} = A\chi + B_1 u + B_2 \omega_d + B_3 \sin(\phi),$$

where $\dot{\chi}$ is the first derivative of $\chi = [e_1\ \dot{e}_1\ e_2\ \dot{e}_2]$, $e_1 = r$ is the lateral offset of the vehicle, $\dot{e}_1$ is the first derivative of $e_1$, $e_2$ is a relative yaw angle of the vehicle, $\dot{e}_2$ is the first derivative of $e_2$, and A, $B_1$, $B_2$ and $B_3$ are parameters determined by one of pole placement or linear-quadratic regulation.

4. The apparatus according to claim 1, wherein the kinematics control is configured to receive, as inputs, the lateral offset r of the vehicle from the reference path and the heading offset $\Delta\psi$ of vehicle heading from the path curvature.

5. The apparatus according to claim 4, wherein the dynamics control is configured to receive, as inputs, the lateral offset r, the first derivative $\dot{r}$ of the lateral offset r, the heading offset $\Delta\psi$, and the first derivative $\Delta\dot{\psi}$ of the heading offset $\Delta\psi$.

6. The apparatus according to claim 1, wherein the dynamics control is configured to output a steering angle $\delta_f$ to the steering control, and wherein the steering control is configured to generate a steering command.

7. The apparatus according to claim 1, wherein the path tracking controller is configured to generate a braking command based on a speed of the vehicle and the determined steering angle.

8. The apparatus according to claim 7, wherein the path tracking controller is configured to generate the braking command when the speed of the vehicle exceeds a predetermined safety limit for the determined steering angle.

9. A vehicle comprising the apparatus according to claim 1, the vehicle further comprising:
   a motor configured to drive wheels of the vehicle;
   a chassis supporting axles on which the wheels are mounted, the steering control configured to generate a steering command controlling the wheels based on the determined steering angle; and
   a brake actuator configured to actuate brakes for one or more of the wheels, the brake actuator configured to receive a braking control signal based on an output of the path tracking controller.

10. The vehicle according to claim 9, wherein the vehicle is an electric vehicle and the motor is an electric motor.

11. A method, comprising:
    capturing an image of a traffic lane in front of a vehicle using at least one camera; and
    detecting lane boundaries and a path curvature for the traffic lane from the image;
    determining a lateral offset of the vehicle from a reference path for the traffic lane and a heading offset for the vehicle from the path curvature;
    using a kinematics control, determining a yaw rate that will maintain the vehicle within the traffic lane based on one or more of a vehicle forward velocity, a relative course angle based on a heading offset for the vehicle, the path curvature, the lateral offset of the vehicle, or feedback from a dynamics control;
    using the dynamics control and the yaw rate determined by the kinematics control, determining a steering angle that will maintain the vehicle within the traffic lane; and
    activating a steering control based on the determined steering angle.

12. The method according to claim 11, wherein the yaw rate $\omega_d$ maintaining the vehicle within the traffic lane is determined from:

$$\omega_d = \frac{\eta}{v\cos(\theta)} + \frac{v\kappa\cos(\theta)}{1-\kappa r},$$

where v is the vehicle forward velocity, $\theta$ is the relative course angle based on the heading offset for the vehicle, $\kappa$ is the path curvature, r is the lateral offset of the vehicle, and $\eta$ is feedback from the dynamics control.

13. The method according to claim 12, wherein the determined steering angle is derived from:

$\dot{\chi}=A\chi+B_1 u+B_2\omega_d+B_3 \sin(\phi),$ where $\dot{\chi}$ is the first derivative of $\chi=[e_1\ \dot{e}_1\ e_2\ \dot{e}_2]$, $e_1$=r is the lateral offset of the vehicle, $\dot{e}_1$ is the first derivative of $e_1$, $e_2$ is a relative yaw angle of the vehicle, $\dot{e}_2$ is the first derivative of $e_2$, and A, $B_1$, $B_2$ and $B_3$ are parameters determined by one of pole placement or linear-quadratic regulation.

14. The method according to claim 11, wherein the kinematics control is configured to receive, as inputs, the lateral offset r of the vehicle from the reference path and the heading offset $\Delta\psi$ of vehicle heading from the path curvature.

15. The method according to claim 14, wherein the dynamics control is configured to receive, as inputs, the lateral offset r, the first derivative $\dot{r}$ of the lateral offset r, the heading offset $\Delta\psi$, and the first derivative $\Delta\dot{\psi}$ of the heading offset $\Delta\psi$.

16. The method according to claim 11, wherein the dynamics control is configured to output a steering angle $\delta_f$ to the steering control, and wherein the steering control is configured to generate a steering command.

17. The method according to claim 11, further comprising:
    generating a braking command based on a speed of the vehicle and the determined steering angle.

18. The method according to claim 17, further comprising:
    generating the braking command when the speed of the vehicle exceeds a predetermined safety limit for the determined steering angle.

19. The method according to claim 11, further comprising:
    driving wheels of the vehicle with a motor;
    supporting axles on which the wheels are mounted with a chassis, the steering control configured to generate a steering command controlling the wheels based on the determined steering angle; and
    actuating brakes for one or more of the wheels based on the speed of the vehicle.

20. The method according to claim 19, wherein the vehicle is an electric vehicle and the motor is an electric motor.

\* \* \* \* \*